Patented Feb. 11, 1936

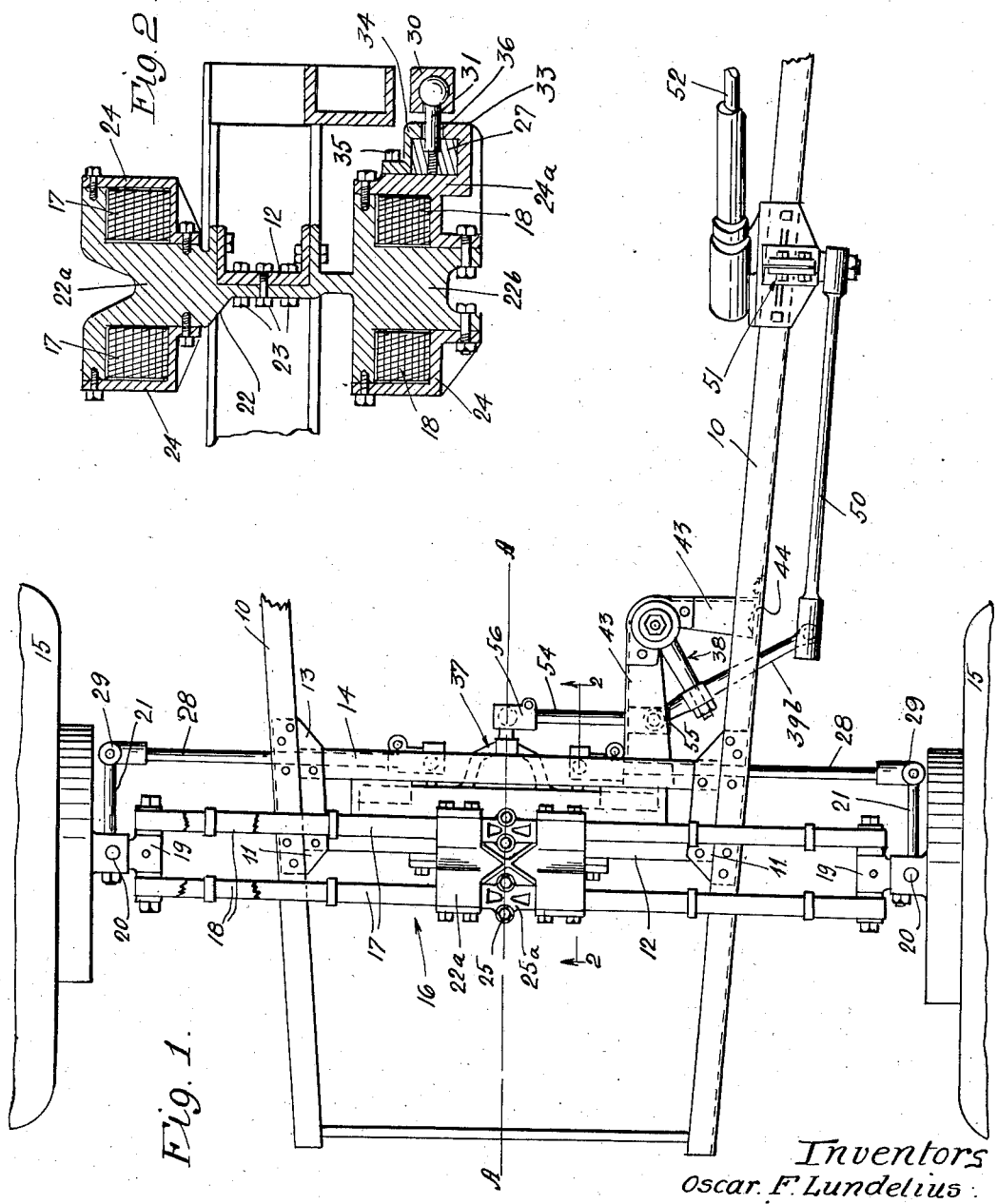

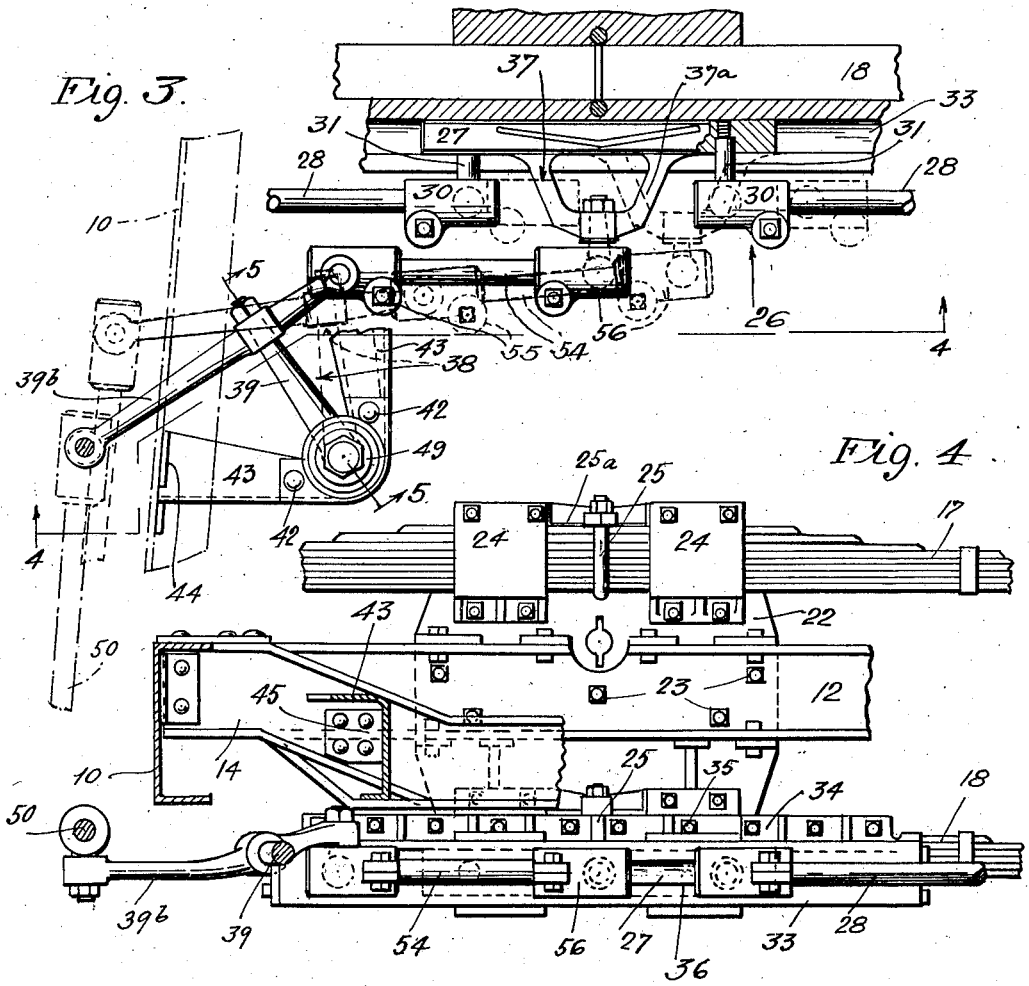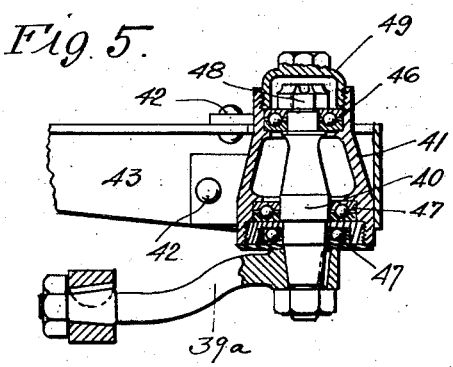

2,030,822

UNITED STATES PATENT OFFICE 2,030,822

STEERING MECHANISM

Oscar F. Lundelius and Melvin N. Lefler, Los Angeles, Calif., assignors to Lundelius & Eccleston Motors Corporation, Los Angeles, Calif., a corporation of Delaware Application February 18, 1933, Serial No. 657,372

3 Claims. (Cl. 280—95)

This invention has to do with steering mechanisms for vehicles and although it is particularly designed and adapted for application to vehicles wherein the wheels are connected to the body by transverse springs rather than by rigid axles, in its broad aspects, the invention is not to be regarded as limited to any particular spring or suspension system.

In Patent No. 1,737,856, issued jointly to us on December 3, 1929, on Steering mechanism for spring supported vehicles, there is disclosed a steering gear similar in certain respects to that contemplated by the present invention, and the general object of the present invention is to provide improvements in the type of mechanism disclosed in the said patent. This general type of steering gear may be characterized as comprising a jointed tie rod connecting the dirigible wheels of the vehicle, and including a transversely movable member confined to a substantially straight line path of travel, and tie rod sections extending from opposite ends of said member to connect with the wheels, or more properly their steering knuckle arms. In the preferred form of the invention as applied to spring supported vehicles, the tie rod sections have universal joint connections with the wheel steering arms and with the transversely moving member, so as to be capable of independent vertical oscillatory movement.

It is a general object of the invention to provide, in combination with a jointed tie rod structure of the character described, an operating mechanism offset toward one side of the vehicle frame, by means of which the tie rod assembly is laterally actuated to steer the dirigible wheels. According to our preferred construction, we provide a laterally movable member, preferably in the form of a horizontally swinging arm, mounted in a laterally offset position with relation to the intermediate tie rod member and connected thereto so that upon actuation of the arm in its swinging movement, the intermediate tie rod member is given lateral movement which is imparted to the wheels through the connecting tie rod sections.

In the particular structure hereinafter described, the intermediate tie rod member comprises a block mounted for transverse sliding movement, and actuated in such movement by suitable connection with a horizontally swinging arm mounted preferably at the inside of the side rails of the frame. The horizontally swinging arm, in turn, is actuated by a drag link connected thereto, preferably, though not necessarily, at a point outside of the frame rail adjacent the arm mounting. By virtue of the offset position of the block actuating arm, the steering gear is arranged in a convenient location without interference with the engine and other centrally located parts of the vehicle, since the transversely extending parts of the gear are placed in advance of the engine and the connections with the offset steering arm are arranged along the outside of the frame.

As previously mentioned, the steering gear is particularly applicable to vehicles wherein the wheels are connected to the frame through transverse springs. Because of the wide range of vehicle deflection of the wheels permitted by this type of spring suspension, the steering problem becomes extremely difficult, though it is successfully met by the present steering gear. This type of spring suspension system, as well as other steering mechanism that has been successfully used in connection therewith, are disclosed in Patent No. 1,886,963 granted November 8, 1932 to Oscar F. Lundelius and John R. Dillon on Steering gear.

The above mentioned and additional objects of the invention, as well as the details of a particular and preferred embodiment thereof, will be understood from the following detailed description throughout which reference is had to the accompanying drawings.

In the drawings:

Figure 1 is a fragmentary plan view of the forward end of a vehicle chassis of the spring supported type, equipped with our improved steering mechanism;

Fig. 2 is an enlarged section on line 2—2 of Fig. 1, illustrating the spring mounting and attached parts;

Fig. 3 is an enlarged fragmentary view, partly in section, showing parts of the steering gear in the aspect of Fig. 1;

Fig. 4 is an elevation on broken line 4—4 of Fig. 3; and

Fig. 5 is a sectional view taken through the horizontally swinging steering arm as indicated by line 5—5 of Fig. 3.

It will be understood that in the broad aspects of the invention, any suitable frame construction may be provided, as well as any suitable number and arrangement of springs, although for the purpose of setting forth a typical construction showing one embodiment of the invention, we shall describe our improved steering gear in connection with a frame structure and frame suspension system generally similar to that described in the Lundelius and Lefler patent referred to hereinabove.

For present purposes, it will be necessary to illustrate and describe only the forward spring suspension system and the forward portion of the frame, which is shown to comprise longitudinally extending side rails 10 interconnected at 11 by a transverse frame member 12, and at 13 with a second downwardly bowed transverse member 14 spaced rearwardly of the frame some distance from the member 12. The dirigible wheels 15 are connected to the frame through a spring suspension system generally indicated at 16, and comprising four transversely extending springs arranged in vertically spaced pairs 17 and 18. The spring terminals are pivotally connected to wheel carriers 19 upon which the wheels 15 are mounted for horizontal turning movement about king pins 20. The wheel assemblies carry the usual steering knuckle arms 21 which are interconnected by the jointed tie rod structure as hereinafter described.

The upper and lower pairs of springs 17 and 18 are connected to the frame by way of a suspension member 22 which is fitted around and attached to the forward transverse frame member 12 by bolts 23, as most clearly shown in Fig. 2. The upper and lower enlarged portions 22a and 22b of the spring suspension member form with the angular plates 24, spring receiving boxes or hangers through which the springs extend at spaced points on opposite sides of their longitudinal centers. The spring leaves are clamped together at their longitudinal centers by U-bolts 25 terminating in plates 25a confined between the spring boxes to prevent longitudinal movement of the springs therein. Since the illustrated form of spring mounting comprises no part of our present invention, it will be unnecessary to go into further detail regarding its structure, although it may be mentioned that for a more detailed description of the mounting, reference may be had to our above noted issued patent wherein this structure is more specifically explained.

The steering knuckle arms 21 are interconnected by a jointed tie rod structure generally indicated at 26 and comprising a transversely movable member in the form of a sliding block 27 confined for movement in a substantially straight line path at right angles with the longitudinal axis A of the frame. Sliding block 27 is connected with the steering knuckle arms by way of oppositely extending tie rod sections 28, the latter having universal joint connections 29 with the steering knuckle arms, and similar connections 30 with pins 31 projecting from block 27 at points equi-distant from the longitudinal frame axis A when the parts are in their normal positions as indicated in Fig. 3.

It will be noted that the wheels, by virtue of their connections with the frame through the transverse spring system, are capable of independent vertical movement as road irregularities are encountered, and that tie rod sections 28 likewise are capable of independent vertical oscillatory movement to allow vertical wheel displacement. Upon vertical displacement of the wheels, the outer ends of the tie rod sections describe arcs of substantial coincidence with those described by the ends of the steering knuckle arms, so that no tendency arises for the wheels to shimmy or wobble as would be the case where a substantial variance would occur between the arcs described by the tie rod and steering knuckle arms.

Block 27 may be confined for transverse sliding movement by any suitable means connected, directly or indirectly, with the frame, although as typical, we have shown a guide means for the block to be formed as a part of, or attached to, the spring suspension member. As shown most clearly in Fig. 2, there is cast integrally with plate 24a confining the rearward lower springs 18, a channel 33 extending transversely of the frame a distance sufficient to accommodate the sliding block within the limits of its travel. The block is held against upward movement by an angular plate 34, coextensive with channel 33, and secured to plate 24a by screws 35. Between channel 33 and plate 34 is a transverse opening or slot 36 through which pins 31 connecting the block with the tie rod sections project.

As shown most clearly in Fig. 3, the sliding block 27 also carries a yoke 37, the arms 37a of which project through opening 36. The block is actuated in its transverse movement to steer the wheels through the tie rod connections, by way of a transversely movable member, generally indicated at 38, mounted at an offset position relative to the longitudinal frame axis, member 38 preferably comprising a T-shaped steering arm or bell crank 39 mounted at the inside of the longitudinal frame rail 10. Referring now to Fig. 5, the steering arm is shown to include a forwardly projecting arm portion 39a carried on a shaft 40 contained within bearing housing 41, the latter being attached by rivets 42 to bracket 43 secured at 44 to the side frame rail and at 45 to the transverse downwardly bowed frame member 12. Shaft 40 is journaled in bearings 46 and 47 inserted as indicated within the housing 41, the shaft carrying on its upper end a nut 48 and the corresponding part of the housing being closed by cap 49.

Attached to the forward end of portion 39a of the steering arm, is a cross arm 39b, the outer end of which projects beyond the side rail of the frame to connect with drag link 50. The latter is actuated to move longitudinally, through the usual connection at 51 with the steering wheel shaft or post 52. The opposite end of the cross arm 39b is connected with yoke 37 attached to the sliding block, by way of rod 54, which has a universal joint connection 55 with the steering arm, and a similar connection 56 with the yoke.

As will be readily understood, upon longitudinal movement of the drag link 50 by turning of the steering wheel shaft, arm 39 is caused to swing horizontally, and, by virtue of its transverse movement, to actuate the sliding block 27. A corresponding movement is imparted from the block to the wheel through the tie rod sections. Assuming the drag link to be moved forwardly, the resulting positions assumed by the steering arm 39, the sliding block and tie rod sections, are shown by the dotted lines in Fig. 3.

Certain distinct advantages are gained by steering the wheels through direct connection with the sliding block rather than, for example, by connecting the drag link with an arm attached to one of the wheel assemblies and causing the other wheel to be operated through the jointed tie rod connection, as disclosed in our patent. In the first place, by actuating the block through a direct connection therewith, we do away with any difficulties such as wheel wobbling, that might arise through a variance between the arcs described, upon vertical wheel displacement, between the drag link and an arm on the wheel assembly to which it might be attached. In the present type of gear, the wheels are assured of maintaining their normal positions with respect to the vertical, and normal relative substantially parallel positions, under all conditions of vertical displacement, since as will readily appear, the springs in their parallel arrangement will tend to maintain the wheels in such positions, and no interference to the spring action will be had by the tie rods.

A further advantage is gained by the invention in that direct connection with the sliding block may be had without interference with the engine and other parts centered in the frame. The horizontally swinging steering arm 39 is sufficiently offset toward the side of the frame and the connection 54 between the arm and the sliding block is located far enough in a forward direction, that the parts of the steering gear avoid the engine which is centered in the frame at the rear of cross member 54 of the steering gear. In order to avoid other possible complications, the cross portion of the steering arm preferably is extended beyond the side of the frame in order that the drag link and its connection with the steering arm will lie at the outside of the frame.

A further advantage is gained by the described arrangement of the steering gear parts and the leverage system involved, by virtue of the resistance to shimmying of the wheels. Concomitant with the capability of the leverage system to effect easier steering, there is also present the reactive tendency of the system to damp out wheel shimmy. The leverage system also eliminates much of the wear on the steering column gears, bushings, etc., and generally contributes to long and satisfactory performance.

We claim:

1. In a vehicle having a frame including a pair of longitudinal side rails, and a pair of dirigible wheels, a tie rod interconnecting said wheels, a horizontally swinging steering arm pivotally mounted on one of said side rails, a transversely extending rod connecting said steering arm with the tie rod, a drag link connected to the steering arm, and means applied to the drag link for reciprocating it.

2. In a vehicle having a frame including a pair of longitudinal side rails, and a pair of dirigible wheels, a tie rod interconnecting said wheels, a horizontally swinging bell crank pivotally mounted on one of said side rails and with one of its arms extending beyond the outside of the rail, means connecting said one arm with the tie rod, and a drag link connected to the other end of said one arm at the outside of said one frame rail.

3. In a vehicle having a frame, a plurality of springs arranged transversely of the longitudinal axis of the frame, means for mounting the springs intermediate their ends on said frame, a pair of wheel-supporting members connected to opposite ends of the springs, and wheels carried on said members, steering mechanism comprising, a block mounted for bodily sliding movement transversely of said frame, guide means confining said block in its path of movement, a pair of independently movable vertically oscillatory rods extending oppositely from said block and connecting with the wheels, a horizontally swinging T-shaped arm pivotally mounted on the frame rearwardly of said rods and at one side of said block, the cross member of the T-arm projecting beyond the outside of the frame, a rod connecting said block with one end of said arm cross member, and a drag link connected to the opposite end thereof at the outside of the frame.

MELVIN N. LEFLER.
OSCAR F. LUNDELIUS.